United States Patent [19]

Shingai et al.

[11] 3,904,563
[45] Sept. 9, 1975

[54] SYNTHETIC RESIN-ACRYLAMIDE DERIVATIVE CONDENSATION PRODUCT BASED POLYMERIZATION COMPOSITION

[75] Inventors: Kiyozo Shingai; Tadashi Watanabe; Koichiro Murata; Osamu Isozaki, all of Hiratsuka, Japan

[73] Assignee: Kansai Paint Co., Ltd., Amagasaki, Japan

[22] Filed: Dec. 26, 1973

[21] Appl. No.: 427,664

Related U.S. Application Data

[62] Division of Ser. No. 187,817, Oct. 8, 1971, Pat. No. 3,799,910.

[30] Foreign Application Priority Data

Oct. 12, 1970 Japan.............................. 45-88793
Oct. 12, 1970 Japan.............................. 45-88794

[52] U.S. Cl. ... 260/22 CB; 117/124 E; 117/132 CB; 117/132 B; 117/148; 117/16 K; 117/161 P; 260/78.5 VA; 260/861; 260/862; 260/879; 260/883; 260/885

[51] Int. Cl.².... C09D 3/49; C09D 3/66; C09D 3/76

[58] Field of Search ....... 260/883, 885, 22 CB, 861, 260/862, 879

[56] References Cited
UNITED STATES PATENTS

| | | | |
|---|---|---|---|
| 3,008,918 | 11/1961 | Stanton et al...................... | 260/883 |
| 3,026,293 | 3/1962 | Caldwell et al..................... | 260/883 |
| 3,062,776 | 11/1962 | Gaylord............................. | 260/901 |
| 3,468,976 | 9/1969 | Yanai et al. ....................... | 260/883 |
| 3,502,745 | 3/1970 | Minton ............................. | 260/883 |

*Primary Examiner*—Ronald W. Griffin
*Attorney, Agent, or Firm*—Ostrolenk, Faber, Gerb & Soffen

[57] ABSTRACT

Polymerizable composition comprising an addition product and an ethylenically unsaturated monomer of less than 300 parts by weight per 100 parts by weight of said addition product; said addition product being prepared by introducing polymerizable unsaturated groups of a derivative of acrylamide through the ether exchange reaction to a compound having at least two hydroxyl groups in the molecule and having a hydroxyl equivalent of 30 to 240 and/or a synthetic resin having more than two hydroxyl groups in the skeleton, having a hydroxyl equivalent of 130 to 3000 and having a number average molecular weight of 500 to 100,000, and said derivative of acrylamide corresponding to the general formula:

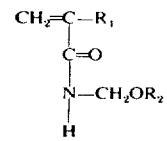

in which $R_1$ is hydrogen or methyl group and $R_2$ is hydrogen or alkyl group of 1 to 8 carbon atoms.

9 Claims, No Drawings

SYNTHETIC RESIN-ACRYLAMIDE DERIVATIVE CONDENSATION PRODUCT BASED POLYMERIZATION COMPOSITION

BACKGROUND OF THE INVENTION

This is a division of application Ser. No. 187,817 filed Oct. 8, 1971, and now U.S. Pat. No. 3,799,910.

This invention relates to polymerizable compositions comprising chiefly an addition product and an ethylenically unsaturated monomer, said addition product being produced by adding a derivative of acrylamide through the ether exchange reaction to a compound having at least two hydroxyl groups in the molecule and/or a synthetic resin having more than two hydroxyl groups in the molecule and/or a synthetic resin having more than two hydroxyl groups in the skeleton (hereinafter they shall be generally referred to as "substance having hydroxyl groups").

Hitherto, the polymerizable compositions which comprise a substance having hydroxyl groups have been commonly used. One such composition comprises mainly urethane resin and an ethylenically unsaturated monomer, said urethane resin being produced by reacting a substance having hydroxyl groups with an isocyanate group, e.g., the addition product produced by the reaction of a diisocyanate compound with a vinyl monomer having a hydroxyl group. In this case, said addition product should ideally consist of only the substance in which 1 mol of said vinyl monomer having hydroxyl groups is reacted with 1 mol of isocyanate groups contained in said diisocyanate compound.

In practice, however, the two isocyanate groups of said diisocyanate compound generally have the same reactivity, and therefore said addition product is regarded as consisting of the substance in which the diisocyanate compound is reacted with the vinyl monomer having hydroxyl groups in equal molar ratio, the substance in which the vinyl monomer having hydroxyl groups is added to all isocyanate groups of the diisocyanate compound, and unreacted diisocyanate compound. When such addition product as described above is reacted with a substance having hydroxyl groups, the unreacted diisocyanate compound contained in the addition product is directly reacted with the substance having hydroxyl groups to form a three-dimensional structure, thus probably resulting in the development of gelation during the reaction process. The urethane resin obtained is liable to form a hydrogen bond structure from the standpoint of chemical structure, and therefore its thixotropy will be enhanced. In urethane resins, it will become difficult to introduce a large amount of polymerizable unsaturated bond groups into the substance having hydroxyl groups because of the above stated reason, and therefore the hardening property of such resin is not satisfactory. Accordingly, the composition comprising chiefly such urethane resin and an ethylenically unsaturated monomer exhibits high thixotropy and its handling will be difficult. Moreover, there is a drawback in that its viscosity is increased or its color is changed during storage. The discoloration may be due to the effect of isocyanate group. This method has still another disadvantage in that it requires a complicated operation as it comprises steps of preparing an isocyanate addition product and of reacting it with a substance having hydroxyl groups. Furthermore, the products obtained by hardening the above composition also have the poor resistance to weather, especially resistance to yellowing, and also the poor resistance to water and salt spray. In cases where the polymerizable unsaturated bond groups are introduced into a substance having hydroxyl groups by the esterification reaction of the substance having hydroxyl groups with an acid such as acrylic acid or methacrylic acid, the reaction of this system requires a reaction temperature above 150° C. even in the presence of a catalyst. Therefore, this method has the disadvantage that the polymerization of acid components with each other occurs before the esterification reaction of the substance having hydroxyl groups with the acid components. Consequently, it will be quite difficult to obtain satisfactory compositions according to this method.

Still another method resides in introducing an unsaturated bond group into a substance having hydroxyl groups by the half-esterification reaction of the substance having hydroxyl groups with anhydride of an unsaturated dibasic acid such as maleic anhydride. This method requires a temperature lower than that in case of using acid components such as acrylic acid or methacrylic acid. However, the ideal reaction mechanism of this system should be such that one of the unsaturated dibasic acids is reacted with the hydroxyl groups of the substance having hydroxyl groups and other carboxyl groups remain in the free state. In practice, however, other carboxyl groups are reacted with other hydroxyl groups of the substance having hydroxyl groups, thus resulting in the formation of the three-dimensional structure and the development of gelation. Even if they are ideally reacted, the resultant product obtained by hardening the above composition and an ethylenically unsaturated monomer will be inferior in resistance to water, alkali and weather. Furthermore, the polymerizable unsaturated groups in the product obtained by this method are the groups introduced by an unsaturated dibasic acid, such as maleic anhydride, and therefore there is selectivity in the resistivity of these polymerizable unsaturated groups with the ethylenically unsaturated monomers. Consequently, the kinds of ethylenically unsaturated monomers usable for cross-linking are limited; the ethylenically unsaturated monomers cannot be freely selected to meet the desired needs. Therefore, the properties of the hardened products will be limited accordingly.

Accordingly, it is an object of this invention to provide polymerizable compositions having excellent properties when hardened.

It is a further object of this invention to provide polymerizable compositions having no thixotropy.

It is a still further object of this invention to provide polymerizable compositions which, when hardened, exhibit the good resistance to yellowing, water and salt spray.

Still another object of this invention is to provide polymerizable compositions in which an addition product having polymerizable unsaturated groups is readily obtained without the development of gelation during the reaction process for introducing the polymerizable unsaturated groups into a substance having hydroxyl groups.

Still other objects will be apparent from the following disclosure.

SUMMARY OF THE INVENTION

This invention relates to polymerizable compositions comprising chiefly an addition product and an ethylenically unsaturated monomer, said addition product being prepared by introducing polymerizable unsaturated groups of a derivative of acrylamide through the ether exchange reaction to a compound having at least two hydroxyl groups in the molecule and/or a synthetic resin having more than two hydroxyl groups in the skeleton, and said derivative of acrylamide corresponding to the general formula:

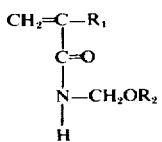

in which $R_1$ is hydrogen or methyl group and $R_2$ is hydrogen or alkyl group of 1 to 8 carbon atoms.

DESCRIPTION OF THE PREFERRED EMBODIMENTS

The addition products which can be used in this invention are obtained by the ether exchange reaction of a substance having hydroxyl groups with a derivative of acrylamide. This ether exchange reaction can be carried out according to known methods which have been commonly used. That is, the hydroxyl groups of a substance having hydroxyl groups is ideally blended with a derivative of acrylamide in an equal molar ratio and the reaction is carried out at a temperature of 50° to 140° C. in the presence of an acidic or alkaline catalyst. As the reaction of this system is an equilibrium reaction, it is necessary to distill condensation water or condensed alcohol out of the system. The reaction of this system is monitored by the amount of distilled condensation water or condensed alcohol. The reaction is regarded as completed when the amount of distillate reaches more than 50%, preferably more than 70%, of the theoretical value. In this system, the ether exchange reaction may be carried out under a reduced pressure in order to promote the distillation of condensation water or condensed alcohol. The addition products which can be effectively applied to this invention may be any products which are produced by reacting from 0.2 to 1.4 mols of a derivative of acrylamide with 1 mol of the hydroxyl groups contained in the substance having hydroxyl groups.

The ether exchange reaction of a substance having hydroxyl groups with a derivative of acrylamide is accomplished by reacting the hydroxyl groups contained in the substance having hydroxyl groups with the methylol group or alkoxy group contained in the derivative of acrylamide. In reacting these substances, they should be most preferably mixed at a rate in which 1 mol of the hydroxyl groups contained in the substance having hydroxyl groups is mixed with 1 mol of the derivative of acrylamide. The addition product useful for this invention will, however, be well obtained if the amount of derivative of acrylamide is in the range of 0.2 to 1.4 mol per 1 mol of hydroxyl groups contained in the substance having hydroxyl groups. If the amount of derivative of acrylamide is less than 0.2 mol, the hydroxyl groups contained in the substance having hydroxyl groups will not participate in the reaction with the derivative of acrylamide and remain in the free state. The products obtained by hardening polymerizable compositions containing the above mentioned addition product are inferior in resistance to water solvent, alkali and weather and lack flexibility, and therefore such products are not practically useful. However, even if the amount of derivative of acrylamide excess 1.4 mol, there will be no problem with the reaction of this system. Furthermore, when hardening the resultant product, the derivative of acrylamide which did not participate in the ether exchange reaction can be used as a monomer for cross-linking. Consequently, the reason why the maximum amount of derivative of acrylamide is limited to 1.4 mol is to ensure full reaction of the hydroxyl groups contained in the substance having hydroxyl groups with the derivative of acrylamide.

The substances having hydroxyl groups for use in this invention are compounds having at least two hydroxyl groups in the molecule and having a hydroxyl equivalent of 30 to 240 and/or synthetic resins having more than two hydroxyl groups in the skeleton and having a hydroxyl equivalent of 130 to 3000.

The compounds having at least two hydroxyl groups and having a hydroxyl equivalent of 30 to 240 are, for example, dihydric alcohols having a hydroxyl equivalent of 30 to 150; trihydric alcohols having a hydroxyl equivalent of 30 to 130; polyhydric alcohols having a hydroxyl equivalent of 30 to 100; monoallyl ethers, having a hydroxyl equivalent of 60 to 200, of the trihydric alcohol mentioned above; monoallyl ethers, having a hydroxyl equivalent of 50 to 140, of the polyhydric alcohol mentioned above; diallyl ethers, having a hydroxyl equivalent of 100 to 240, of the polyhydric alcohol mentioned above; and tris(hydroxy ethyl) isocyanurate. The synthetic resins, having more than two hydroxyl groups and having a hydroxyl equivalent of 130 to 300, and a number average molecular weight of 500 to 100,000 are, for example, polybutadiene glycol having a number average molecular weight of 600 to 5000 and having two hydroxyl groups at the molecular ends, acrylic resin having a number average molecular weight of 1000 to 100,000 and having a hydroxyl equivalent of 130 to 3000, alkyd resin (i.e., acrylic monomer-polyol product) having a number average molecular weight of 500 to 5000 and having a hydroxyl equivalent of 200 to 2000, and unsaturated polyester resin having a number average molecular weight of 500 to 5000 and having a hydroxyl equivalent of 200 to 2000. One or more than two compounds and/or synthetic resins selected from the above substances can be applied. The dihydric alcohols, for example, include ethylene glycol, propylene glycol, diethylene glycol, butylene glycol, hexane diol, 2,2-dimethylpropane diol, etc. The trihydric alcohols, for example, include glycerine, trimethylol ethane, trimethylol propane, hexane triol, etc. The polyhydric alcohols, for example, include pentaerythritol, sorbitol, diglycerol, dipentaerythritol, etc. The mono- or diallyl ethers, for example, include trimethylol propane monoallyl ether, pentaerythritol monoallyl ether, pentaerythritol diallyl ether, etc. The substances having hydroxyl groups can be dissolved in the derivative of acrylamide because thixotropy is not exhibited during the ether exchange reaction through a polymer of high molecular weight as the substance is used. One or more than two compounds selected from the above mentioned substances can be employed.

The derivatives of acrylamide to be applied to this invention may have the general formula

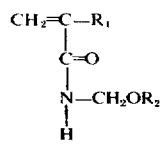

(in which $R_1$ is hydrogen or methyl group and $R_2$ is hydrogen or alkyl group of $C_1$ to $C_8$). For example, they are N-methoxymethyl acrylamide, N-methoxymethyl methacrylamide, N-ethoxymethyl acrylamide, N-n-propoxymethyl methacrylamide, N-sec-propoxymethyl acrylamide, N-sec-propoxymethyl methacrylamide, N-n-butoxymethyl acrylamide, N-sec-butoxymethyl acrylamide, N-tert-butoxymethyl acrylamide, N-n-butoxymethyl methacrylamide, N-sec-butoxymethyl methacrylamide, N-tert-butoxymethyl methacrylamide, N-pentoxymethyl acrylamide, N-pentoxymethyl methacrylamide, N-octoxymethyl acrylamide, N-octoxymethyl methacrylamide, etc. It is especially preferable to this invention that the derivative of acrylamide comprises N-ethoxymethyl methacrylamide, N-n-propoxymethyl methacrylamide, N-sec-propoxymethyl methacrylamide, N-n-butoxymethyl methacrylamide, N-sec-butoxymethyl methacrylamide and N-tert-butoxymethyl methacrylamide. One or more than two compounds selected from the above substances can be applied.

It is preferable that the ether exchange reaction of the substance having hydroxyl groups and the derivative of acrylamide should be carried out at a temperature of 50° to 140°C. in the presence of acidic or alkaline catalyst. In this case, if the reaction is carried out at a temperature lower than 50°C. in the presence of catalyst, the reaction speed will be very low and such reaction is not practical. If the reaction is carried out at a temperature higher than 140°C. in the presence of catalyst, polymerization of derivatives of acrylamide with each other may occur, thus resulting in gelation. Therefore, it will be difficult to obtain the addition product useful for this invention. If the reaction is carried out without using a catalyst, the reaction will not proceed smoothly, and therefore this method will not be practical from the industrial standpoint.

The amount of acidic or alkaline catalyst to be added to this system should be preferably from 0.05 to 3.0 percent by weight with respect to the total amount of the substance having hydroxyl groups and derivative of acrylamide. If the amount of catalyst to be added is less than 0.05 percent by weight, its effects will be reduced and the reaction speed will be greatly slowed down. If the amount of catalyst exceeds 3.0 percent by weight, the same results as obtained in case of the reaction at a temperature higher than 140°C. will be obtained, and therefore it will be difficult to obtain the addition product useful for this invention. In the ether exchange reaction, either acidic or alkaline catalysts may be used. However, it is preferable to use acidic catalysts.

The acidic or alkaline catalysts for use in this invention may be the ones which are commonly used. In the capacity of acidic catalyst, any inorganic acids except nitric acid may be used. For example, hydrochloric acid, sulfuric acid, phosphoric acid, monobutyl phosphoric acid, dibutyl phosphoric acid. Also usable as acidic catalyst are organic acids such as acetic acid, oxalic acid, tartaric acid, benzoic acid, paratoluene sulfonic acid, monochloro: acid, dichloroacetic acid, trichloroacetic acid, r eic acid, fumaric acid, trimellitic acid, acidic ion exchange resin, etc. Applicable as alkaline catalyst are potassium hydroxide, sodium hydroxide, ammonia water, triethylamine, monobutylamine, dibutylamine, tributylamine, etc.

If necessary for facilitating the reaction operation in the ether exchange reaction or facilitating handling of reaction products or for any other purposes, the reaction may be carried out in the presence of solvent. The amount of solvent to be used may vary with the purpose of use but is not specifically limited. Any solvent except water, alcohol and ether may be used. For example, solvents based on hydrocarbons, solvents based on ketone, solvents based on ester, vinyl monomer, etc., are effectively used.

The ethylenically unsaturated monomers for use in this invention are the conventionally known monomers. For example, they include styrene, vinyl toluene, vinyl acetate, diallyl phthalate, divinylbenzene, ethyleneglycol-dimethacrylate, trimethylolpropane-trimethacrylate, 2,5-dichlorostyrene, triallyl cyanurate and acrylates or methacrylates having the following general formula:

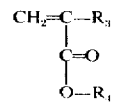

(in which $R_3$ is hydrogen or methyl group and $R_4$ is hydrogen, glycidyl group or alkyl group of 1 to 16 carbon atoms). Examples of acrylates or methacrylates are acrylic acid, methylacrylate, ethylacrylate, butylacrylate, 2-ethylhexyl acrylate, methacrylic acid, methyl methacrylate, ethyl methacrylate, butyl methacrylate, lauryl methacrylate, glycidyl methacrylate, etc. One or more than two compounds selected from the above mentioned monomers can be used.

The composition obtained according to this invention comprises chiefly the addition product produced by the reaction of the substance having hydroxyl groups with a derivative of acrylamide, and the ethylenically unsaturated monomer. Their ratio should be preferably in the range of less than 300 parts by weight of the ethylenically unsaturated monomer with respect to 100 parts by weight of said addition product. If the amount of the ethylenically unsaturated monomer exceeds 300 parts by weight, the velocity of the crosslinking reaction will become very low. Moreover, the hardened products will undergo degradation of mechanical strength or resistance to solvents, and therefore they are practically unsatisfactory.

In order to stabilize the polymerizable compositions obtained according to this invention, in the ether exchange reaction system or for the addition products, a polymerization inhibitor may be added in the amount of 50 to 5000 PPM with respect to the addition products. The polymerization inhibitors for use in this case include hydroquinone, mono-t-butyl hydroquinone, catechol, 2,5-di-t-butyl hydroxytoluene, picric acid, di-p-fluorophenyl amine, p-benzoquinone, hydroquinone monomethylether, 2,5-diphenyl-p-benzoquinone, toluquinone, 2,5-di-tert-amylhydroquinone, etc.

The compositions produced according to this invention are free from various defects as described hereinbefore.

This invention relates to a polymerizable composition obtained by reacting a derivative of acrylamide with a hydroxyl group of a substance having hydroxyl groups in the manner as described above as a means for introducing the polymerizable unsaturated groups into a substance having hydroxyl groups. As a result of the completion of this invention, no thixotropy or gelation is exhibited at all in the course of reaction for introducing the polymerizable unsaturated groups, and therefore the introduction of polymerizable unsaturated groups is not obstructed. The products thus obtained do not cause increase in viscosity, do not exhibit thixotropy and do not undergo discoloration during storage. The final products obtained by hardening the above mentioned polymerizable composition will not undergo degradation of resistance to water, alkali, weather and yellowing.

That is, the addition product to be employed in the polymerizable composition of this invention is obtained by the ether exchange reaction of a substance having hydroxyl groups with a derivative of acrylamide. Furthermore, the ether exchange reaction of this system is carried out at a comparatively low temperature in the range of 50° to 140° C. Accordingly, the desired ether exchange reaction can be carried out without causing the polymerization of derivatives of acrylamide with each other, thus effectively introducing the polymerizable unsaturated groups contained in the derivative of acrylamide into a substance having hydroxyl groups. Moreover, in the reaction of this system, there will be observed no chemical structure of developing thixotropy and gelation which are observed in conventional methods utilizing the above mentioned addition products based on isocyanate, acidic components such as acrylic acid and methacrylic acid, or anhydrides of unsaturated dibasic acids, and therefore the introduction of the polymerizable unsaturated groups into a substance having hydroxyl groups is not obstructed at all by the gelation or thixotropy. The increase in viscosity or yellowing which is observed in conventional composition using urethane resins during storage is considered to be caused by the isocyanate group. In this invention, however, there will be observed no increase in viscosity or yellowing.

Furthermore, the addition products useful for this invention do not require a complicated process as in conventional methods utilizing an addition product based on isocyanate in which an addition product of diisocyanate compound and an unsaturated compound having hydroxyl group is first prepared and then said addition product is reacted with a substance having hydroxyl groups. As the ether exchange reaction according to this invention introduces the polymerizable unsaturated groups by directly adding a derivative of acrylamide into a substance having hydroxyl groups, the whole process can be shortened.

Urethane resin obtained by employing conventional addition products based on isocyanate undergoes discoloration during storage. The hardened final products also undergo discoloration. Therefore, they are inferior in resistance to weather. It is considered that the above mentioned drawback is due to the existence of isocyanate group. The addition products used in this invention do not contain any isocyanate group or element that may degrade resistance to weather, and therefore they do not undergo discoloration during storage and the hardened final products do not show any degradation of resistance to weather.

Moreover, the composition according to this invention is hardened by the cross-linking reaction of an addition product with an ethylenically unsaturated monomer. In this case, any ethylenically unsaturated monomers which react with the derivative of acrylamide can be applied to this invention. Any of the ethylenically unsaturated monomers such as described hereinbefore can be used. Thus, there is no selectivity of the monomers as in the method utilizing anhydrides of unsaturated dibasic acids.

Moreover, it is considered that free carboxyl groups remain in the products obtained by the conventional method utilizing anhydrides of unsaturated dibasic acids such as maleic anhydride. Therefore, there is a possibility that the resistance of such products to water, alkali or weather may be degraded because of such carboxyl groups. As the addition products of this invention do not include any such factors, they will not undergo degradation of resistance to water, alkali and weather.

Accordingly, there will be no gelation, thixotropy or yellowing observed during storage of addition products to be used for the polymerizable composition of this invention. Consequently, various defects inherent in conventional compositions can be completely eliminated in the polymerizable compositions of this invention. Furthermore, the products obtained by hardening the compositions of this invention are greatly improved in resistance to weather, yellowing, water and salt spray compared with the conventional compositions.

The compositions produced according to this invention can be quickly hardened by heating them in the presence of thermal polymerization initiator or by subjecting them to ionizing radiation or by subjecting them to light radiation in the presence of photosensitizer. If necessary, the compositions according to this invention can be used after being dissolved in conventional solvents. Furthermore, these compositions can be used together with pigments, dyes or other fillers. The compositions obtained according to this invention can be used for molding compositions, laminated boards, casting compositions, adhesives or surface coating agents.

This invention will be further described with reference to the following Examples.

I. Production of additive based on derivative of acrylamide.

PRODUCTION EXAMPLE 1

Three mols of N-n-butoxymethyl acrylamide and 1 mol of trimethylol propane were introduced into a reaction vessel provided with a thermometer, stirrer and a pressure reducing line having a solvent trap vessel cooled by a dry ice-methanol system, into which 2,6-di-t-butyl-hydroxytoluene and paratoluene sulfonic acid as an acidic catalyst were added in the amount of 500 PPM and 0.1 percent by weight, respectively, with respect to the total amount of said two substances. The ether exchange reaction was carried out at a temperature of 80° C. under reducing pressure (20–100 mmHg), taking care not to allow spouting of the introduced substances. As the reaction of this system is an equilibrium reaction, n-butanol was distilled. In this Example, the additive based on derivatives of acrylamide was obtained by conducting the reaction until 2.85 mols of n-butanol were distilled. It took about 5 hours to complete the reaction. Thixotropy was not exhibited during the reaction process in this Example or in the product thus obtained. The product showed Newton's flow.

In order to determine the reactivity in the ether exchange reaction of a substance having hydroxyl groups with a derivative of acrylamide in this invention, the infrared spectrum of a mixture of 3 mols of N-n-butoxymethyl acrylamide and 1 mol of trimethylol propane as well as the product obtained by this Example was measured and analyzed.

As the result, in the spectrum of the mixture of N-n-butoxymethyl acrylamide and trimethylol propane there were observed the absorptions of O—H, N—H and $CH_2$ in the vicinities of 3400 $cm^{-1}$, 3300 and 2950, respectively. On the other hand, it was considered that the product obtained in this Example was the result of the ether exchange reaction

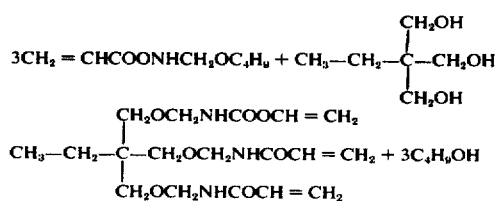

As the reaction of this system is an equilibrium reaction, 2.85 mols of butanol were distilled in this Example as described above. Compared with the spectrum of the above mentioned mixture, the spectrum of the thus obtained product showed remarkable reduction of the absorptions of O—H in the vicinity of 3400 $cm^{-1}$ and $CH_2$ in the vicinity of 2950 $cm^{-1}$. From these findings, it was proved that in the reaction product obtained by this Example, the ether exchange reaction was ideally conducted as shown by the above described reaction formula, as the result of which distillation of butanol took place.

PRODUCTION EXAMPLE 2

Two moles of N-methoxymethyl acrylamide and 1 mol of polyethylene glycol having a molecular weight of 200 were introduced into a reaction vessel comprising a thermometer, stirrer, dropping funnel and a device for removing solvent having a reverse flow cooler in the upper part thereof connected to a branch pipe and a separating funnel in the lower part thereof, into which parabenzoquinone and paratolluene sulfonic acid as an acidic catalyst were introduced in the amount of 300 PPM and 0.2 percent by weight, respectively, with respect to the total amount of said two substances. Furthermore, toluene was added to obtain 75% toluene solution.

When the temperature was raised to 70°C., methanol produced by the ether exchange reaction was boiled together with toluene and was distilled. Toluene was supplied by the dropping funnel in an amount equal to the distilled toluene. When the reaction was conducted at a temperature of 70° C. for 8 hours, 1.6 mols of methanol were distilled and the reaction was interrupted. During the reaction process of this Example and in the product thus obtained, no gelation or thixotropy was exhibited.

PRODUCTION EXAMPLE 3

181 grams of N-methylol acrylamide and 1 kg of acrylic copolymer resin having a molecular weight of 10,000 (comprising 50 percent by weight of styrene, 20 percent by weight of hydroxyethyl methacrylate and 30 percent by weight of butyl acrylate) were introduced into the same reaction vessel as used in Production Example 2, into which hydroquinone and paratoluene sulfonic acid were introduced in the amount of 1000 PPM and 0.2 percent by weight, respectively, with respect to the total amount of said two substances. Furthermore, toluene was added to obtain 50% toluene solution. The reaction was carried out at a temperature of 120° C. When the reaction was conducted at a temperature of 120° C. for 5 hours, 25 grams of water were distilled and the reaction was interrupted. (The reactivity of N-methylol acrylamide was 90%).

During the reaction process in this Example and in the product thus obtained, no gelation and thixotropy was exhibited.

PRODUCTION EXAMPLE 4

Four mols of N-ethoxymethyl acrylamide and 1 mol of pentaerythritol were introduced into the same reaction vessel as used in Example 2, into which 2,6-di-t-butyl hydroxytoluene and paratoluene sulfonic acid were introduced in the amount of 600 PPM and 0.1 percent by weight, respectively, with respect to the total amount of said two substances. When the mixture system was reacted at a temperature of 100° C. for 5 hours, 3.0 mols of ethanol obtained by the ether exchange reaction were distilled. During the reaction process of this Example and in the reaction product, no gelation or thixotropy was exhibited.

II. Examples

EXAMPLE 1

Into 70 parts by weight of the additive obtained in Production Example 1, 30 parts by weight of ethyl acrylate and 1.5 parts by weight of benzoinethyl ether as a photosensitizing substance were dissolved, and applied onto a hard board of 10 mm in thickness so that the thickness of coated film became equal to 50 microns, and was subjected to radiation from a 2KW high-tension mercury arc lamp with a radiation distance of 30 cm at room temperature for 30 seconds.

Comparative Example 1

The acrylic resin consisting of 5 mols of styrene, 2 mols of ethyl acrylate, 2.5 mols of n-butyl acrylate, and 0.5 mol of 2-hydroxyethyl methacrylate was reacted with 0.5 mol of an additive based on an isocyanate which was obtained by reacting 2-hydroxyethyl methacrylate with tolylene diisocyanate in an equal molar ratio, thus obtaining a urethane-modified acrylic resin. 30 parts by weight of ethyl acrylate and 1.5 parts by weight of benzoinethyl ether as a photosensitizing substance were dissolved in 70 parts by weight of said urethane-modified acrylic resin. The resultant mixture was applied on a hard board in the same manner as in Example 1 and was hardened.

EXAMPLE 2

100 parts by weight of the solution of additive obtained in Production Example 2 were dissolved in 25 parts by weight of butyl methacrylate, in which 2 parts by weight of benzoyl peroxide were dissolved as a thermal polymerization initiator. The resultant mixture was applied on a cold-finished soft steel plate of 0.8 mm in thickness so that a dried film of 35 microns in thickness was obtained, and was dried by heating at a temperature of 140° C. for 30 minutes.

EXAMPLE 3

150 parts by weight of the solution of additive obtained in Production Example 3 were dissolved in 25 parts by weight of n-butyl methacrylate in which 2 parts by weight of benzoyl peroxide were dissolved as a thermal polymerization initiator. The resultant mixture was applied on a cold-finished steel plate of 0.8 mm in thickness so that a dried film of 35 microns in thickness was obtained, and was dried by heating at a temperature of 140° C. for 30 minutes.

Comparative Example 2

One mol of maleic anhydride was added through a half-esterification reaction to the acrylic resin comprising 5 mols of methyl methacrylate, 4 mols of ether acrylate and 1 mol of 2-hydroxypropyl methacrylate, thus obtaining a maleic acid modified acrylic resin. 25 parts by weight of n-butyl methacrylate and 2 parts by weight of benzoyl peroxide were dissolved in 75 parts by weight of said modified acrylic resin. The resultant mixture was applied in the same manner as in Example 2 and was dried by heating to be hardened.

Comparative Example 3

A mixture of 0.5 mol of phthalic anhydride, 0.4 mol of adipic acid, 0.4 mol of neopentyl glycol, 0.6 mol of trimethylol propane and 0.2 mol of fatty acid of linseed oil was condensed to the acid value of 10, thus obtaining a polyester resin. On the other hand, tolylene diisocyanate was reacted with 2-hydroxyethyl methacrylate in an equal molar ratio to obtain an additive. 40 parts by weight of said additive were added to 100 parts by weight of said polyester resin, thus obtaining a urethane-modified polyester resin. 50 parts by weight of titanium white were dispersed in a mixture of 50 parts by weight of said modified polyester resin, 40 parts by weight of styrene and 10 parts by weight of divinylbenzene, thereby obtaining a white enamel. This enamel was applied and the coated film was hardened in the same manner as in Example 3.

EXAMPLE 4

50 parts by weight of titanium white were dispersed into a mixture solution of 50 parts by weight of the additive obtained in Production Example 4, 40 parts by weight of styrene and 10 parts by weight of divinylbenzene, thereby obtaining a white enamel. This enamel was applied on a glass plate of 1.5 mm in thickness so that the film of 20 microns in thickness was obtained, which was subjected to radiation to harden the coated film by using accelerated electron rays under the conditions of 300 KV, 25 mA and 5M rad.

EXAMPLE 5

Tests were conducted on the paints obtained in Examples 1 through 4 and the Comparative Examples 1 through 3 as well as on their hardened coated films, the results of which are illustrated below.

| Samples | Paint Condition | Performance of Coated Film Pencil Hardness (*1) | Yellowing (*2) |
|---|---|---|---|
| Example 1 | Good | 4H | No yellowing |
| Comparative Example 1 | Significant thixotropy | H | Significant yellowing |
| Example 2 | Good | 3H | No yellowing |
| Example 3 | Good | 3H | No yellowing |
| Comparative Example 2 | Slightly turbid in white | Not hardened | Test was not conducted as it was not hardened |
| Comparative Example 3 | Significant thixotropy | H | Significant yellowing |
| Example 4 | Good | 5H | No yellowing |

(*1) Conducted in accordance with JIS-K-5652.
(*2) These are the results obtained through exposure to Sunshine weathermeter for 200 hours.

We claim:

1. Polymerizable composition comprising (a) a condensation product of (1) at least one synthetic resin having at least two hydroxyl groups in the skeleton selected from the group consisting of polybutadiene glycol having a number average molecular weight of 600 to 5000 and having two hydroxyl groups at the molecular ends; acrylic resin having a number average molecular weight of 1000 to 100,000 and having a hydroxyl equivalent of 130 to 3000; alkyd resin having a number average molecular weight of 500 to 5000 and having a hydroxyl equivalent of 200 to 500; and unsaturated polyester resin having a number average molecular weight of 500 to 5000 and having a hydroxyl equivalent of 200 to 2000; and (2) 0.2 to 1.4 moles per mole of hydroxyl groups of a derivative of acrylamide of the formula

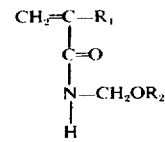

wherein $R_1$ is hydrogen or methyl and $R_2$ is hydrogen or alkyl of 1 to 8 carbon atoms, and (b) less than 300 parts by weight per 100 parts of said condensation product and at least 25 parts per 150 parts of said condensation product of an ethylenically unsaturated monomer.

2. Polymerizable composition according to claim 1 in which said ethylenically unsaturated monomer is at least one of styrene, vinyl toluene, vinylacetate, diallyl phthalate, divinylbenzene, ethyleneglycol-dimethacrylate, trimethylolpropane-trimethacrylate, 2,5-dichlorostyrene, triallyl cyanurate and acrylate or methacrylate having the general formula:

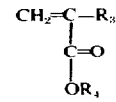

in which $R_3$ is hydrogen or methyl and $R_4$ is hydrogen, a glycidyl group of an alkyl group of 1 to 16 carbon atoms.

3. Polymerizable composition according to claim 2 in which said acrylate or methacrylate is at least one of acrylic acid, methyl acrylate, ethyl acrylate, butyl acrylate, 2-ethylhexyl acrylate, methacrylic acid, methyl methacrylate, ethyl methacrylate, butyl methacrylate, lauryl methacrylate and glycidyl methacrylate.

4. Polymerizable composition according to claim 1 in which said derivative of acrylamide is at least one of N-methoxymethyl acrylamide, N-methoxymethyl methacrylamide, N-ethoxymethyl acrylamide, N-ethoxymethyl methacrylamide, N-n-propoxymethyl acrylamide, N-n-propoxymethyl methacrylamide, N-sec-propoxymethyl acrylamide, -N-sec-propoxymethyl methacrylamide, N-n-butoxymethyl acrylamide, N-sec-butoxymethyl acrylamide, N-tert-butoxymethyl acrylamide, N-n-butoxymethyl methacrylamide, N-sec-butoxymethyl methacrylamide, N-tert-butoxymethyl methacrylamide, N-pentoxymethyl acrylamide, N-pentoxymethyl methacrylamide, N-octoxymethyl acrylamide and N-octoxymethyl methacrylamide.

5. Polymerizable composition according to claim 1 in which said derivative of acrylamide is at least one of N-ethoxymethyl methacrylamide, N-n-propoxymethyl methacrylamide, N-sec-propoxymethyl methacrylamide, N-n-butoxymethyl methacrylamide, N-sec-butoxymethyl methacrylamide and N-tert-butoxymethyl methacrylamide.

6. Polymerizable composition of claim 1 wherein said synthetic resin is said polybutadiene glycol.

7. Polymerizable composition of claim 1 wherein said synthetic resin is said acrylic resin.

8. Polymerizable composition of claim 1 wherein said synthetic resin is said alkyd resin.

9. Polymerizable composition of claim 1 wherein said synthetic resin is said unsaturated polyester resin.

* * * * *